United States Patent
Ueda et al.

(10) Patent No.: US 10,901,075 B2
(45) Date of Patent: Jan. 26, 2021

(54) SONIC WAVE APPARATUS

(71) Applicant: DENSO CORPORATION, Kariya (JP)

(72) Inventors: Keisuke Ueda, Kariya (JP); Yasuhiro Kawashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/349,110

(22) PCT Filed: Oct. 5, 2017

(86) PCT No.: PCT/JP2017/036354
§ 371 (c)(1),
(2) Date: May 10, 2019

(87) PCT Pub. No.: WO2018/088081
PCT Pub. Date: May 17, 2018

(65) Prior Publication Data
US 2019/0277955 A1 Sep. 12, 2019

(30) Foreign Application Priority Data
Nov. 14, 2016 (JP) .................................. 2016-221772

(51) Int. Cl.
*B60R 19/48* (2006.01)
*G01S 15/93* (2020.01)
(Continued)

(52) U.S. Cl.
CPC .............. *G01S 7/521* (2013.01); *B60R 19/48* (2013.01); *B60R 19/483* (2013.01); *G01S 15/931* (2013.01); *G01S 2015/938* (2013.01)

(58) Field of Classification Search
CPC ....... B60R 19/48; B60R 19/483; G01S 7/521; G01S 7/524; G01S 7/526; G01S 15/931; G01S 15/938; G01S 15/937
(Continued)

(56) References Cited

U.S. PATENT DOCUMENTS 3,212,387 A * 10/1965 Madansky ................ F16B 5/02
411/371.2
4,257,465 A * 3/1981 Berg ....................... F16B 39/24
411/147
(Continued)

FOREIGN PATENT DOCUMENTS

WO 2010/146618 A1 12/2010
WO WO 2013/114466 A1 8/2013

*Primary Examiner* — Dennis H Pedder
(74) *Attorney, Agent, or Firm* — Maschoff Brennan (57) ABSTRACT

A sonic wave apparatus is provided with an apparatus body and a cushioning member. The apparatus body is configured with a columnar front-end section having a level difference. The apparatus body includes a sonic wave unit disposed on the front-end section and a support member supporting the sonic wave unit. The apparatus body is inserted into and attachment hole that is formed on a part of the vehicle. The cushioning member includes a tubular portion covering the front-end section, a plate shaped flange that is extended from one end of the support section of the tubular portion, along an end surface of side being a front-end side of the support section, and a protrusion portion that is arranged on the flange and protrudes in an extending direction from the flange of the tubular portion. The cushioning member is formed as one body from elastomer.

18 Claims, 5 Drawing Sheets

(51) Int. Cl.
*G01S 7/521* (2006.01)
*G01S 15/931* (2020.01)

(58) Field of Classification Search
USPC .......................... 411/546, 531, 533; 293/117
See application file for complete search history.

(56) References Cited

U.S. PATENT DOCUMENTS

| | | | |
|---|---|---|---|
| 7,891,927 B2* | 2/2011 | Burger | F16B 5/0233 |
| | | | 411/546 |
| 10,422,875 B2* | 9/2019 | Hirakawa | G01S 7/521 |
| 2009/0196121 A1 | 8/2009 | Wehling et al. | |
| 2012/0000302 A1 | 1/2012 | Inoue et al. | |

* cited by examiner

SONIC WAVE APPARATUS

This application is a U.S. National Phase Application under 35 U.S.C. 371 of the International Application PCT/JP2017/036354 filed on Oct. 5, 2017, and published as WO2018/088081 on May 17, 2018. This application is based on and claim the benefit of priority from Japanese Application No. 2016-221772, submitted on Nov. 14, 2016, the entire of each of which the above application are incorporated herein by reference. Also, any applications for which a foreign or domestic priority claim is identified in the Application Data Sheet as filed with the present application are hereby incorporated by reference under 37 CFR 1.57.

BACKGROUND

Technical Field

The present disclosure relates to a sonic-wave apparatus that is configured to be mounted on a part of the vehicle.

An ultrasonic sensor module disclosed in International Publication WO 2010/146618 is mounted to a bumper of a vehicle. The ultrasonic sensor module is provided with an assembly section relative to the bumper that is inserted through an attaching hole provide on the bumper. When the ultrasonic wave sensor module is mounted onto the bumper, an elastic member that is formed from silicon, for example, is used. Specifically, when the ultrasonic sensor module is mounted to the bumper, this elastic covers the assembly section of the ultrasonic sensor module. In this state, the assembly section of the ultrasonic wave section is pushed through the attachment hole of the bumper.

SUMMARY OF DISCLOSURE

However, various disturbances are transmitted to vehicle parts, such as vibrations when a vehicle is moving, and physical blows when a vehicle is washed or when performing maintenance, for example. In such cases, in the configuration disclosed in the international patent literature WO 2010/14668, an attached state of the elastic member may be altered, causing a change in the usual mounted state, that is, from a predetermined state, and consequently situations in which the elastic body is detached from the mounted state, for example, may also occur.

In view of the issues described above, the present disclosure aims to provide a sonic wave apparatus that is mounted to a part of the vehicle and in which a mounted state of the sonic apparatus to the part of the vehicle is reliably maintained.

SUMMARY

A sonic wave apparatus according to one mode of the present disclosure is mounted to a part of the vehicle. The sonic wave sensor apparatus includes an apparatus body that has a columnar shape, and a cushioning member, and constitutes a front-end section that has a small radius.

The support section supports the sonic wave unit to form a step between the sonic wave unit and the support section. Specifically, the apparatus body includes a sonic wave unit and a support section that supports the sonic wave unit.

The part of the vehicle has a through-hole that is an attachment through-hole configured thereon. The attachment through-hole facilitates the insertion of the front-end section into the attachment through-hole.

The cushioning member has a tubular portion that covers the front-end section of the apparatus body, a plate shaped flange, and a protrusion portion. The flange is configured to extend from one end of the support section of the tubular portion, along an end surface of side being a front-end side of the support section, and the protrusion portion is configured on the flange and provided to protrude in an extending direction from the flange of the tubular portion. The cushioning member is formed as one body from elastomer.

According to the configuration above, when the sonic wave apparatus is mounted onto the part of the vehicle, the protrusion portion that is provided on the cushioning member protrudes in the extending direction, that is, towards the part of the vehicle. The protrusion portion is in contact elastically with a part (for example, a bezel) that intervenes between the part of the vehicle and apparatus body or with the part of the vehicle. As a result, changes in a mounted state of the cushioning member, from a predesignated state, and the detachment of the cushioning member, from the front-end section of the apparatus body, for example, can be suppressed. Furthermore, according to the configuration the mounted state of the sonic wave apparatus on the part of the vehicle is reliably maintained.

It is noted that the reference symbols used for each means in the claims corresponds with the reference symbols of the same means which are exemplified in the embodiments hereafter.

BRIEF DESCRIPTION OF DRAWINGS

In the accompanying drawings.

EMBODIMENTS OF THE DISCLOSURE

Hereafter the embodiments will be described with reference to drawings. Each kind of modification, which may be adopted to the embodiments, will also be described after the embodiments (Configuration)

Figure 1:
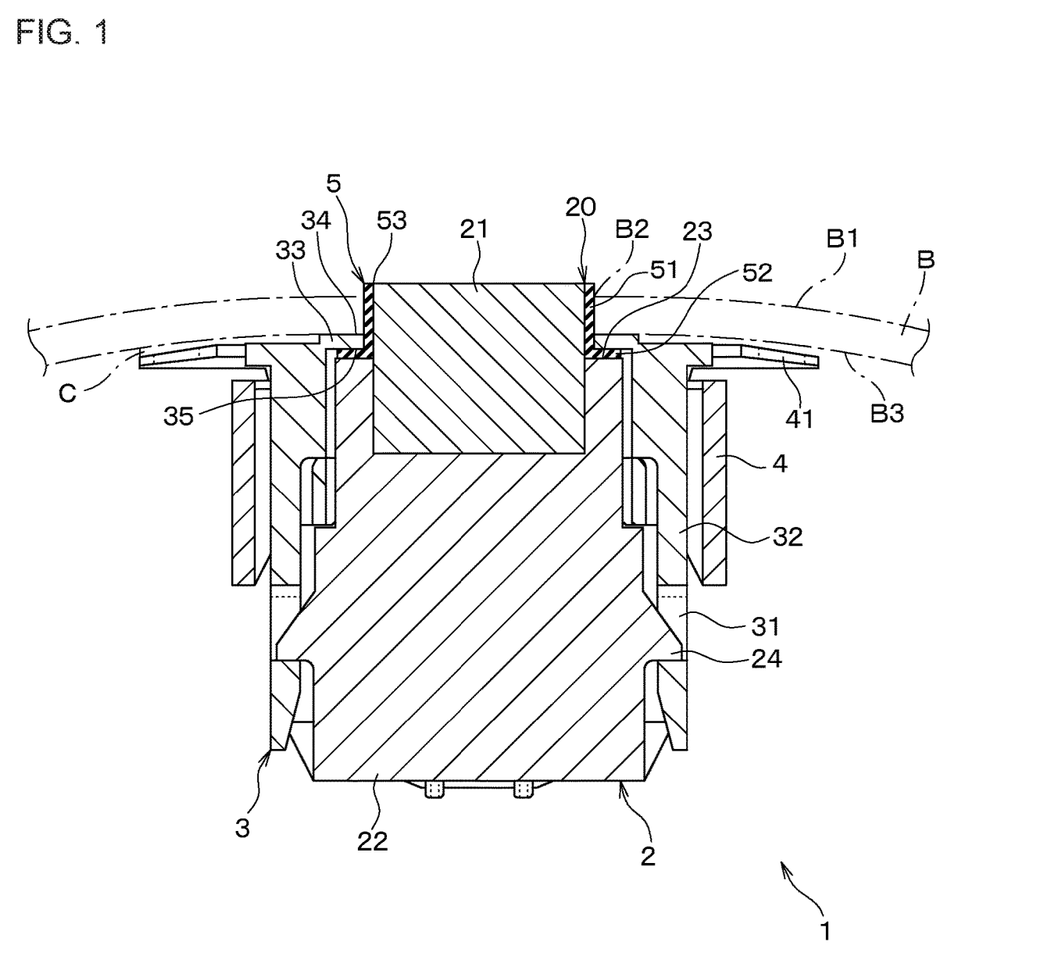
FIG. 1 is a side cross section diagram showing an overall configuration of a sonic wave apparatus according to an embodiment.

With reference to FIG. 1, a sonic wave apparatus 1 of a first embodiment is provided to transmit and receive ultrasonic waves, that is, a clearance sonar, and can be mounted to a part of the vehicle, specifically, a bumper B. The sonic wave apparatus 1 is provided with an apparatus body 2, a bezel 3, an attachment member 4 and a cushioning member 5.

The apparatus body 2 is formed as a round column shape with a level difference, and is provided with a front-end section 20 that has a small radius that is smaller than the apparatus body 2. The apparatus body 2 is configured so that the front-end section 20 can be inserted through an attachment through-hole B2 that is a through-hole which is formed on the bumper B. Specifically, the apparatus body 2 includes a sonic wave unit 21 and a support section 22.

In the first embodiment, the sonic wave unit 21 that is configured of the apparatus body 2 and the front-end section 20 is a round-column shaped ultrasonic wave unit. Hereon, a center axis of the round-columnar sonic wave unit 21 and direction that is parallel thereto will be referred to as an axial direction. The axial direction is a vertical direction of FIG. 1. A radial direction is an arbitrary straight line that extends in a radiated-manner from the center axis of the sonic wave unit, and is orthogonal the axial direction. Furthermore, a front-end direction is given as a direction towards the sonic wave unit 21 from the support section 22, which is the parallel direction to the axial direction. The front-end direction is specifically an upper part of FIG. 1.

A part of the sonic wave unit 21 is disposed on a front-end direction side thereof. Specifically, the part of the sonic wave sensor 21 that covers approximately half of the area of the sonic wave unit 21 of FIG. 1 is disposed to protrude from a front-end surface 23 of the support section 22. This part is supported by the support section 22.

In the first embodiment, when the sonic wave unit 21 has the sonic wave apparatus 1 mounted onto the bumper B, that is in a mounted state, a front end (specifically, an end in the front-end direction) of the sonic wave sensor unit 21 slightly protrudes to an outside from an outer surface B1 of the bumper, which is an outer surface of the bumper B. A structure, omitted from the figures, that intervenes between the sonic wave unit 21 and the support section 21, suppresses transmission of vibrations from the sonic wave unit 21 to the support section 22.

The front-end surface 23 of the support section 22 that supports the sonic wave unit 21 is specifically an end surface on a side of the front-end section 20. The front-end surface 23 is a flat surface that is formed along the radial direction and is orthogonal to the axial direction. Also, the support section 22 has a plurality of interlocking protrusions 24 that are formed in the radial direction. The interlocking protrusions 24 are formed to interlock with an interlocking hole 31 on the bezel 3, when the apparatus body 2 is accommodated inside the bezel 3.

The bezel 3 has a tubular shape that accommodates the apparatus body 2, while the front-end section 20 of the apparatus body 2 protrudes along the front-end direction to the outside. That is, the bezel 3 has a bezel main body 32 and a bumper contact portion 33.

The bezel main body 32 has a columnar part that is arranged to surround the support section 22 from a side part and a plurality of interlocking holes 31. The interlocking holes 31 are through-holes that pass through a wall portion of the tubular bezel main body 32 in the radial direction, and are arranged in positions that oppose the interlocking protrusions 24 configured on the support section 22. The bumper contact portion 33 is a plate shaped portion that extends in the radial direction, as an extending portion from the end section on the front-end direction side (that is, upper part in the figures) towards the center axis of the sonic wave unit 21.

The bumper contact portion 33 has a bumper contact surface 34 and an opposed sonar surface 35. When the sonic wave apparatus 1 is mounted onto the bumper 3, the bumper contact surface 34 is formed along the bumper inner surface B3 so that the bumper contact surface is in contact with a bumper inner surface B3. The opposed sonar surface 35 is opposed to the upper-end surface 23 of the support section 22 provided on the apparatus body 2 and is formed as a flat surface that is also parallel to the upper-end surface 23. A predetermined gap is provided between the upper-end surface 23 and the opposed sonar surface.

The attachment member 4 is a tubular portion that is configured to surround the bezel 3 from the outside and is joined to the bezel 3 via a fixing means that is omitted from the figures. The attachment member 4 has an adhesive flange 41. The adhesive flange 41 is a part onto which the bumper inner surface B3 is adhered thereto via an adhesive layer C, for example, a two-sided tape, and is configured to extend from the end section on the front-end direction side (that is, the upper part in the figures) of the attachment member 4, along the bumper inner surface B, in the radial direction.

The cushioning member 5 suppresses vibrations from being transmitted from the apparatus body 2 to the respective bezel 3 and the bumper B. The cushioning member 5 has a tubular portion 51 and a flange 52 which are formed as one body, without adjoining lines, and is formed from an elastomer, for example, silicon rubber.

The tubular portion 51 is circular-tube shaped (that is a pipe shape or a ring shape) that covers an extended section that extends from the front-end direction of the front-end surface 23 of the support section 22, on the sonic wave unit 21. In the first embodiment, an insertion hole 53 that is a column formed space is formed on an inner side in the radial direction of the columnar portion 51. The sonic wave unit 21 is inserted into the insertion hole 53. In the first embodiment, the tubular portion 51 is arranged to cover from the bumper outer surface B1 to the front end of the sonic wave unit 21 which extends to the outside, when the sonic wave apparatus 1 is mounted to the bumper B from the top-end surface 23 of the support section 22.

The flange 52 is a flat plate shaped section extends in the radial direction. Specifically, the flange 52 is formed to extend from one end, that is, a basal end of the tubular portion 51, on a side of the support section 22, along the top end surface 23 of the support section 22 of the tubular portion 51.

Figure 2:
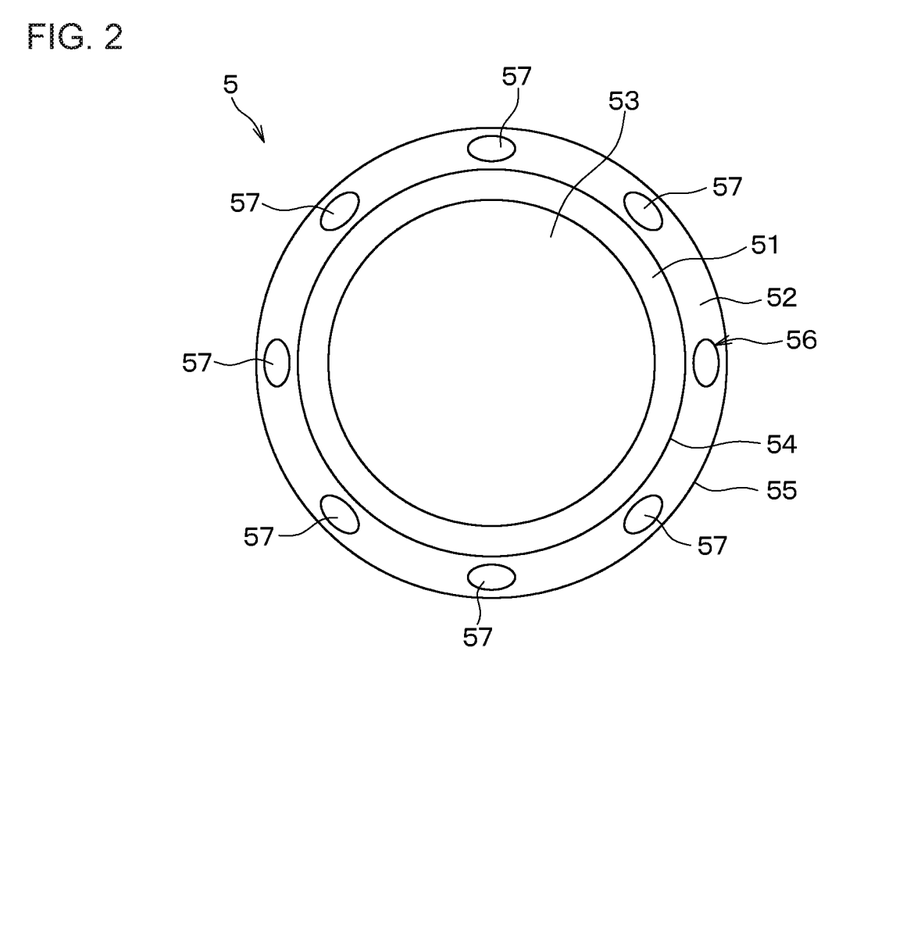
FIG. 2 is a plan view of a cushioning member shown in FIG. 1.
Figure 3:
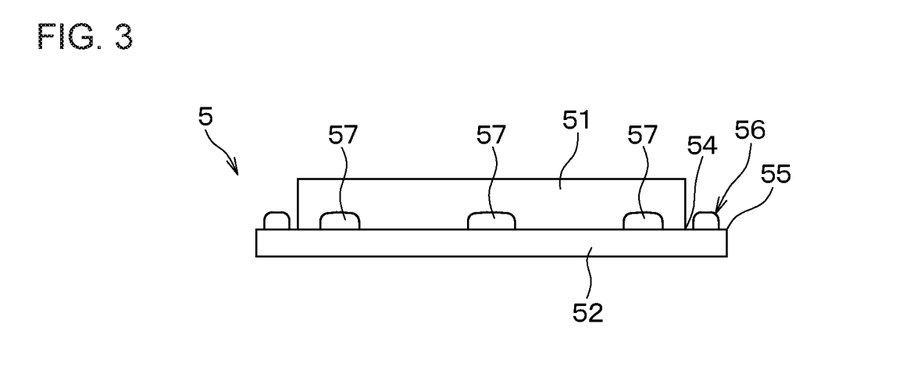
FIG. 3 is a side surface view of the cushioning member shown in FIG. 2.

A configuration of the cushioning member 5 according to the first embodiment will be described with reference to FIGS. 2 and 3 that are enlarged diagrams of the cushioning member 5. When viewed from a line parallel to the axial direction, the flange 52 is formed in a ring shape. In the radial direction of the flange 52, an inner-edge part 54 is connected to the basal end of the tubular portion 51. An outer-edge part 55 of the flange 52 is extended from the inner-edge part 54 towards the outside, in the radial direction.

In the first embodiment, the cushioning member 5 is provided with a protrusion portion 56. The protrusion portion 56 is provided on the flange 52 and protrudes from the flange 52 provided on the tubular portion 51. More specifically, the protrusion 56 protrudes towards the front-end direction protrudes from the flange 52, and thus has close contact with the bezel 3 (specifically the bumper contact portion 33).

In the first embodiment, the protrusion portion 6 is configured of a plurality of protrusions 57. The plurality of protrusions 57 are arranged along a circumference of the flange 52 that configures the outer-edge section 55. When viewed from the line that is parallel to the axial direction, the protrusions 57 are each formed in an oval shapes with a short or a long diameter in the radial direction. The protrusions 57 have a height (specifically, a dimension in the axial direction) that resists buckling when a load is applied in the axial direction. Specifically, the protrusions 57 are formed so that the height is equal to or lower than a thickness of the flange 52 (specifically, the dimension in the axial direction).

Effects

Hereon, effects of the above configuration is described with reference to FIGS. 1 to 3.

When the sonic wave apparatus 1 is mounted to the bumper B, firstly, the apparatus body 2, the bezel 3 and the attachment member 4 are joined to each other. The front-end section 20 of the apparatus body 2 is mounted onto the cushioning member 5.

It is noted that the cushioning member 5 may be pre-mounted onto the apparatus 2 prior to joining the respective apparatus body 2, the bezel 3 and the attachment member 4 to each other. In contrast, the cushioning member 5 may be mounted onto the front-end section 20 of the apparatus body 2, after joining the respective apparatus body 2, the bezel 3 and the attachment member 4 to each other.

Next, the adhesive layer C is pasted onto the adhesive flange 41 of the attachment member 4. The front-end section 20 of the apparatus body 2, which at that point is covered by the cushioning member 5, is then inserted into the attachment hole B2 of the bumper B. Thereafter, the sonic wave apparatus 1 is pressed onto the bumper B so that the adhesive layer C is closely adhered to the bumper inner surface B3.

An outer surface of the bumper contact surface 33 on the bezel 3 is the bumper contact surface 34. When the sonic wave sensor 1 mounted onto the bumper B (that is, in a mounted state) the bumper contact surface 34 is in contact with the bumper inner surface B3. The tubular portion 51 of the cushioning member 5 is intervened between an inner surface of the attachment hole B2 and the sonic wave unit 21. The tubular portion 51 of the cushioning member 5 is also intervened between an end surface on an inner side of the bumper contact portion 33, in the radial direction and the sonic wave unit 21. As a result, vibrations that are transmitted mainly in the radial direction from the apparatus body 2 to the respective bezel 3 and bumper B are suppressed.

In the configuration according to the first embodiment, when the sonic wave sensor 1 is mounted onto the bumper B, that is, in the mounted state on the bumper B, the protrusion portion 56 provided on the cushioning member 5 protrudes towards the front-end direction from the bumper B. The protrusion portion 56 is elastically in contact with the bumper contact portion 33 on the bezel 3, which is intervened between the bumper B and the apparatus body 2. According to the configuration, the flange 52 on the cushioning member 5 is desirably maintained between the top-end surface 23 of the support section 22 and the bumper contact surface of the opposed sonar surface 35.

Incidentally, various disturbances are transmitted to vehicle parts, such as vibrations when a vehicle is moving, and physical impact when a vehicle is washed or when performing maintenance, for example. For example, when a car is washed, the bumper outer surface B1 is polished with a towel. At this point, a large external force may be applied to the columnar portion 51 of the cushioning member 5. In particular, since the front-end section of the columnar portion 51 protrudes from the bumper outer surface B1 to the outside, if a large external force is applied to the front-end section of the columnar portion 51, the mounted state of the cushioning member 5 may be disturbed, specifically, moved from a predetermined state, or detached from the front-end section 20 of the apparatus body 2.

However, according to the configuration of the first embodiment, since the protrusion portion 56 is configured on the flange 52, the cushioning member 5 is desirably fixed. As a result, disturbances of the mounted state of the cushioning member 5, which is shown in FIG. 1, or the detachment of the cushioning member 5 from the front-end section 20 of the apparatus 2 occurring, can be suppressed. As a result, according to the configuration above, the mounted state of the sonic wave apparatus 1 to the bumper B is reliably maintained.

In the configuration of the first embodiment, the mounting performance of the sonic wave apparatus 1 to the bumper B is enhanced by providing the protrusion portion 56 on the cushioning member 5, and this is achieved by a simple configuration.

According to the configuration of the first embodiment, manufacturing cost of the sonic wave apparatus 1 is enhanced, and the mounting performance of the sonic wave sensor 1 to the bumper B1 is improved without detrimentally affecting a working operation when mounting the sonic wave sensor 1. A load that is received by the protrusion portion 56 is received in a direction that crosses with the radial direction, that is, an orthogonal direction to the radial direction. According to the configuration of the first embodiment, enhancement of mounting the sonic wave apparatus 1 to the bumper B is achieved without affecting the features as an ultrasonic wave sensor.

Modified Example

The present disclosure is not limited to the embodiment described above, and the embodiment may be appropriately modified. A representing modified example will now be described. In the modified example described hereafter, only parts and elements that differ from the first embodiment will be described. The same symbols will be used for the elements and parts in the modified example that are the same or equivalent to the first embodiment. Therefore in the modified example described hereafter, configuring elements that are the same as the first embodiments are appropriately supported by the first embodiment unless stated otherwise.

The mounted state of the sonic wave apparatus 1 to the bumper B is not limited to the configuration described above. For example, when the sonic wave apparatus 1 is mounted onto the bumper B, the sonic wave unit 21 may be configured with a front end of the sonic wave apparatus 1 that is not configured to protrude from the bumper outer-surface B. That is, the sonic wave unit 21 may be configured with an outer surface on the upper side of FIG. 1 that is substantially at the same level as the bumper outer surface B1.

The attachment member 4 may be formed as one body with the bezel 3. In contrast, the bezel 3 may be omitted, for example. That is, the sonic wave apparatus 1 may also be directly mounted onto the bumper B, which is a bezel-less type sonic wave apparatus 1.

A mounting vehicle part of the sonic wave apparatus 1 is not limited to the bumper B that is described above. For example, the sonic wave apparatus 1 may be configured to be mountable to a panel of the vehicle.

Figure 4:
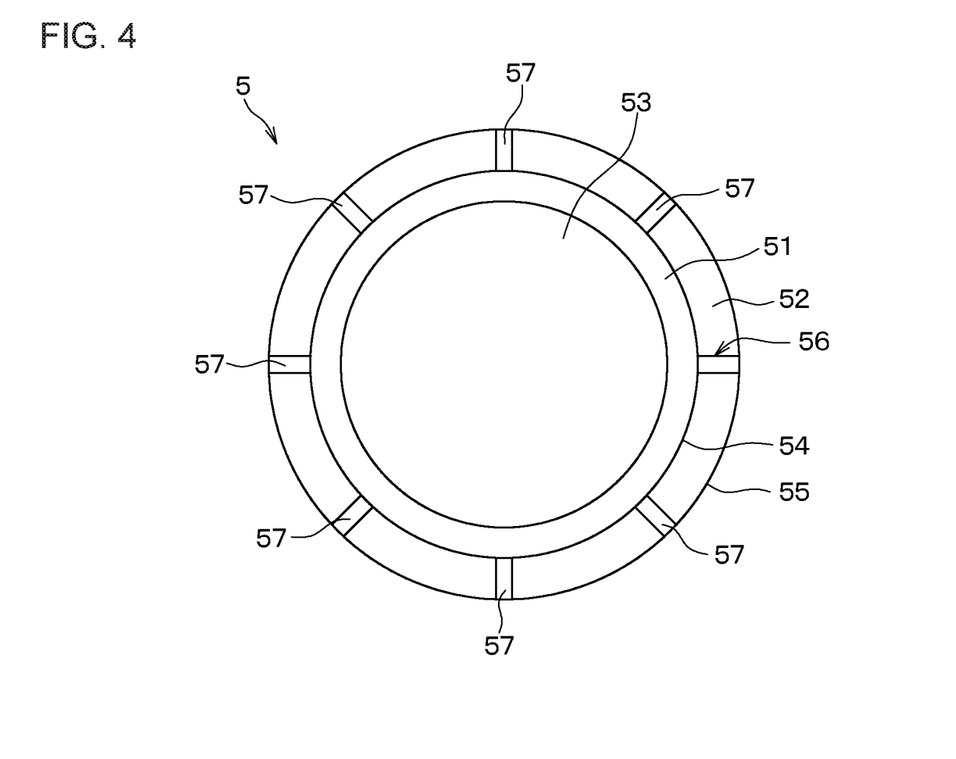
FIG. 4 is a plan view of the cushioning member according to a modified example.

A configuration of the protrusion portion 56 is not limited to that of the above-described configuration. For example, as shown in FIG. 4 and FIG. 5, the protrusions 57 may be lip shaped protrusions that extend in the radial direction of the outer-edge part 55.

Figure 5:
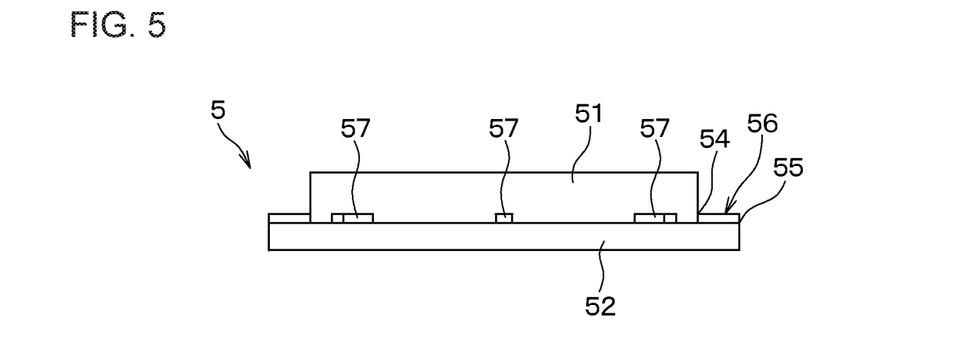
FIG. 5 is a side surface view of the cushioning member shown in FIG. 4.
Figure 6:
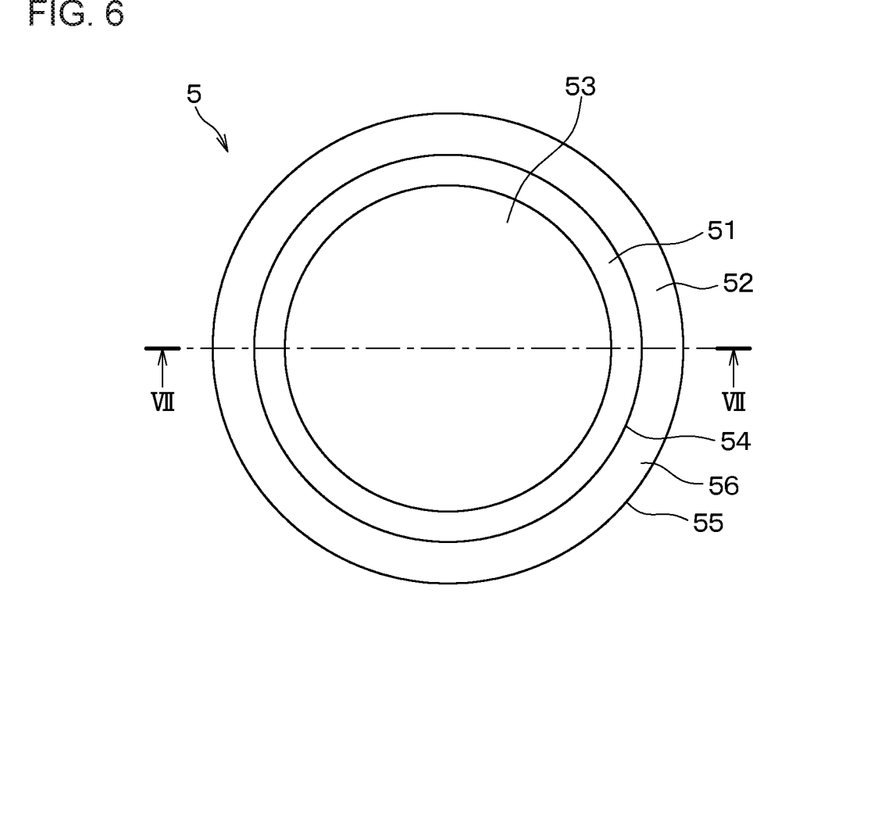
FIG. 6 is a plan view of the cushioning member according to another modified example.
Figure 7:
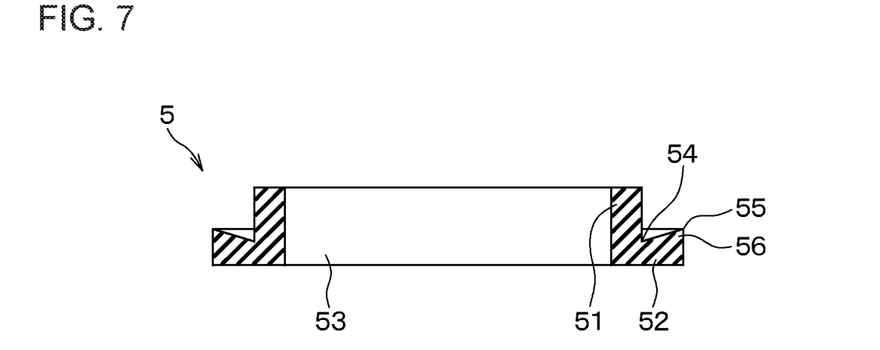
FIG. 7 shows a cross section view of VII-VII in FIG. 6.

As shown in FIG. 5 and FIG. 6, the flange 52 may be configured with the outer-edge part 55 that has a greater thickness than an inner-edge part 54. In this case, the protrusion portion 56 is configured on the outer-edge part 55.

Figure 8:
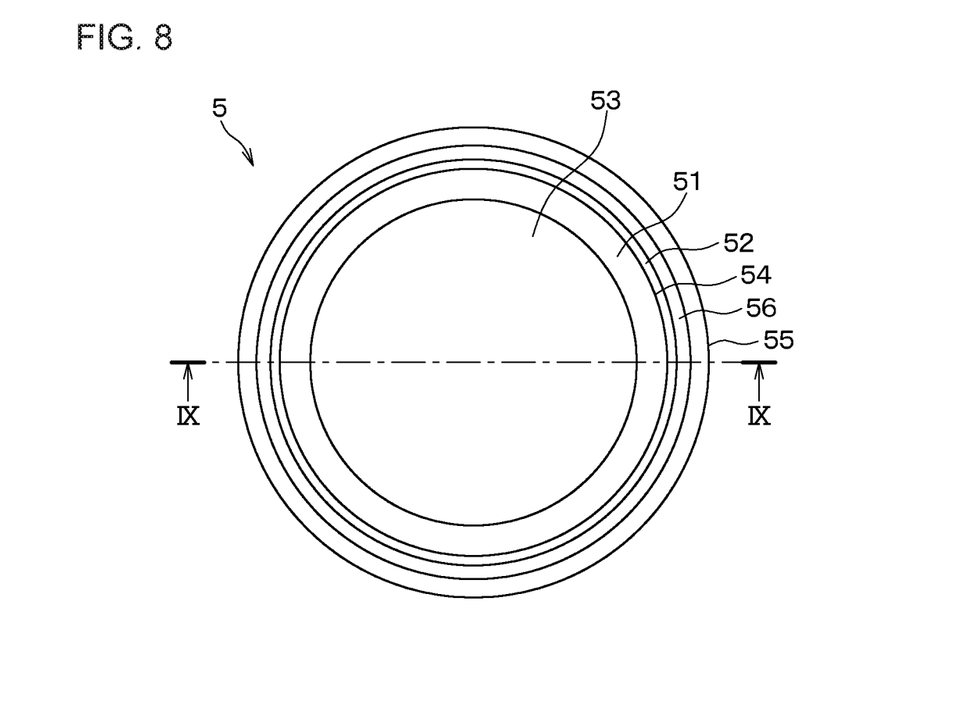
FIG. 8 shows a plan view of the cushioning member according to a first modified example.
Figure 9:
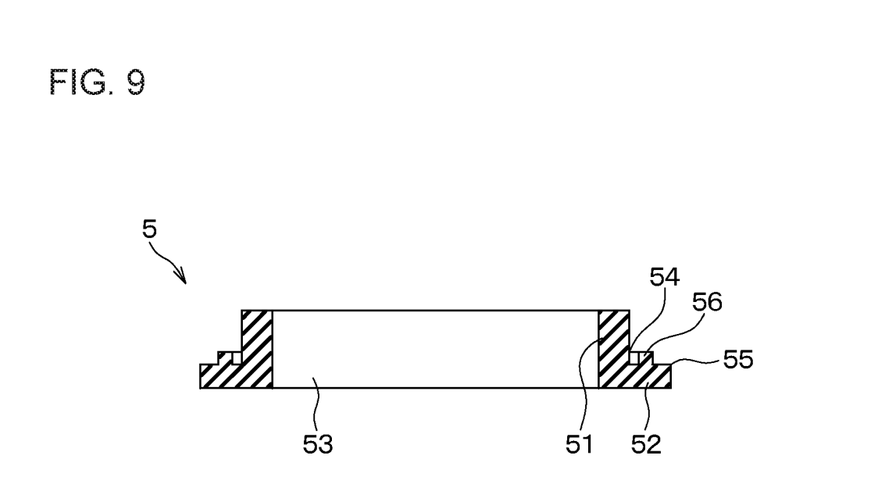
FIG. 9 is a cross sectional view along a line IX-IX of FIG. 8.

As shown in FIG. 8 and FIG. 9, a ring shape may be formed between the inner-edge part 54 and the outer-edge part of the flange 52.

The sonic wave apparatus 1 adopted to the present disclosure is not limited to receiving and transmitting ultrasonic waves. For example, the sonic wave sensor 1 may be configured to only transmit waves, or in contrast only transmit and/or receive audible sonic waves.

The modifications to the embodiments are not limited to that of the above described. That is, a plurality of modified examples may also be combined. Furthermore, the entire embodiment or a part thereof may also be combined with the entire modified examples or a part thereof.

The invention claimed is:

1. A sonic wave apparatus mounted to a part of a vehicle, the sonic wave apparatus comprising;
   an apparatus body comprising:
     a columnar shape having an axial direction and a radial direction that is orthogonal to the axial direction;
     a sonic wave unit provided with a front-end section located on a front part of the apparatus body in the axial direction, the front-end section having a radius that is smaller than a radius of the apparatus body; and
     a support section configured to support the sonic wave unit, the support section comprising a step between the sonic wave unit and the support section; and
   a cushioning member comprising:
     a tubular portion that covers the front-end section of the apparatus body;
     a plate shaped flange located on a front end, relative to the axial direction, of the support section of the tubular portion, the plate shape flange configured to extend in the radial direction along an end surface of the support section, the end surface being a front-end side of the support section; and
     a protrusion portion provided on the plate shaped flange and configured to protrude in the axial direction from the plate shaped flange of the tubular portion towards the part of the vehicle,
   wherein
     the front-end section is positioned within an attachment hole formed on the part of the vehicle, the attachment hole comprising a through-hole that enables insertion therein,
     the tubular portion and the plate shaped flange are formed as one body made of an elastomer, and
     the protrusion portion provides elastic cushioning between the sonic wave unit and the part of the vehicle.

2. The sonic wave apparatus according to claim 1, wherein the protrusion portion is provided as a plurality of protrusion portions.

3. The sonic wave apparatus according to claim 2, wherein the plate shaped flange comprises:
   a ring shape, when viewed from the front-end side of the support section; and
   an outer-edge part that forms a circumference,
   wherein the plurality of protrusions portions are arranged along the circumference of the outer-edge part.

4. The sonic wave apparatus according to claim 1, wherein the plate shaped flange is configured with an inner-edge part and an outer-edge part,
   the inner-edge part is configured to connect to the tubular portion and has a smaller thickness than the outer-edge part, and the protrusion portion is formed on the outer-edge part of the plate shaped flange.

5. The sonic wave apparatus according to claim 1, wherein the plate shaped flange comprises:
   a ring shape, when viewed from the front-end side of the support section; and
   an inner-edge part configured to connect to the tubular portion of the plate shaped flange, the ring shape intervening between the inner-edge part and an outer-edge part of the plate shaped flange.

6. The sonic wave apparatus according to claim 1, further comprising a tubular bezel that accommodates the apparatus body in which the front-end section is exposed to an outside of the part of the vehicle, wherein the protrusion portion is in contact with the tubular bezel.

7. The sonic wave apparatus according to claim 1, wherein the sonic wave unit is an ultrasonic wave unit.

8. The sonic wave apparatus according to claim 2, further comprising a tubular bezel that accommodates the apparatus body in which the front-end section is exposed to an outside of the part of the vehicle, wherein the protrusion portion is in contact with the tubular bezel.

9. The sonic wave apparatus according to claim 3, further comprising a tubular bezel that accommodates the apparatus body in which the front-end section is exposed to an outside of the part of the vehicle, wherein the protrusion portion is in contact with the tubular bezel.

10. The sonic wave apparatus according to claim 4, further comprising a tubular bezel that accommodates the apparatus body in which the front-end section is exposed to an outside of the part of the vehicle, wherein the protrusion portion is in contact with the tubular bezel.

11. The sonic wave apparatus according to claim 5, further comprising a tubular bezel that accommodates the apparatus body in which the front-end section is exposed to an outside of the part of the vehicle, wherein the protrusion portion is in contact with the tubular bezel.

12. The sonic wave apparatus according to claim 2, wherein the sonic wave unit is an ultrasonic wave unit.

13. The sonic wave apparatus according to claim 3, wherein the sonic wave unit is an ultrasonic wave unit.

14. The sonic wave apparatus according to claim 4, wherein the sonic wave unit is an ultrasonic wave unit.

15. The sonic wave apparatus according to claim 5, wherein the sonic wave unit is an ultrasonic wave unit.

16. The sonic wave apparatus according to claim 6, wherein the sonic wave unit is an ultrasonic wave unit.

17. The sonic wave apparatus according to claim 1, wherein the protrusion portion is provided as a plurality of protrusion portions which are arranged in a circumferential direction at equal intervals on an other edge part of the plate shaped flange.

18. The sonic wave apparatus according to claim 1, further comprising a tubular bezel that intervenes between the part of the vehicle and the apparatus body, and is provided with a portion, and the protrusion portion is elastically in contact with the portion.

* * * * *